Figure 1:
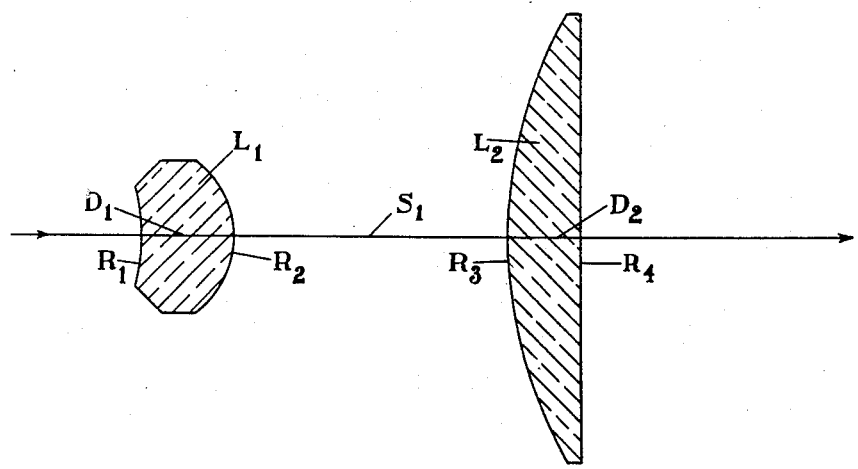

April 10, 1951 J. R. MILES 2,547,958
OPTICAL SYSTEM FOR OBJECTIVES AND EYEPIECES
Filed Feb. 8, 1949

*INVENTOR.*
*John R. Miles*

Patented Apr. 10, 1951

2,547,958

UNITED STATES PATENT OFFICE 2,547,958

OPTICAL SYSTEM FOR OBJECTIVES AND EYEPIECES

John R. Miles, Des Plaines, Ill., assignor to Chicago Aerial Survey Company, Chicago, Ill., a corporation of Illinois Application February 8, 1949, Serial No. 75,268

4 Claims. (Cl. 88—57)

The present invention relates generally to optical devices, and more particularly to improvements in optical devices, such as objectives and/or eyepieces for viewfinders, periscopes, or the like.

Heretofore, in the manufacture of optical instruments, such as objectives and/or eyepieces for viewfinders, periscopes, or the like, a considerable amount of visual rectilinear distortion was accepted, or a very complex or difficult to manufacture system was adopted, whereby the visual rectilinear distortion could be at least partially corrected. In these prior complex systems, often several strongly refracting lenses were employed, with each lens contributing as small as possible an amount of visual rectilinear distortion, and, by this means, the final summated distortion could be reduced. In other cases, heretofore, lenses having non-spherical surfaces were used, whereby each zone of the field of view could be considered separately, and thus carry its own distortion correction. In all these prior systems of this type, which are often referred to interchangeably as eyepieces and objectives, the cost in manufacture and/or the residual summated visual rectilinear distortion was too great to make the system practical where wide angles of view over 70° were required.

Accordingly, it is an object of the present invention to provide novel means whereby a relatively simple lens system of the class described, having substantially spherical axially located surfaces is built, and, at the same time, to obtain substantial visual rectilinear distortion correction for a field of more than 70°, while keeping all other aberrations within tolerable limits.

Another object is to provide a novel lens unit for optical instruments, of the class described, whereby the visual rectilinear distortion is substantially corrected for a field of view of more than 70° by combining the spherical aberrations of two lenses or groups of lenses.

Another, and more specific object, is to provide a novel lens system for instruments of the class described in which two substantially plano-convex lenses, with spherical surfaces, are used with their convex surfaces towards each other so that the spherical aberrations of the principal rays in the two lenses are so combined that the tangents of the angles the exiting principal rays make with the axis are substantially proportional to the tangents of the angles the entering principal rays make with the axis, and in which the exiting principal rays converge substantially toward a single point which is more or less remote from the system, and make angles with the axis less than 5°, while the edge of the field entering principal rays make angles of more than 35° with the axis, and do not pass through a single point.

Another, and still more specific object, is to provide a novel system of lenses for instruments of the class described, in which the principal rays lying in the space between the two principal lenses, or systems of lenses, vary in their angle of incidence on the inner strong surface, or one of the inner strong surfaces of the entering lens, or lens system, in such a way that at least one of these principal rays, usually at, or near, the edge of the field, is normal to said inner surface, so that the curvature of said inner surface may be varied, while maintaining this normalcy without any effect on said principal ray, whereby the refraction of the other principal rays may be altered by said change of curvature of said inner surface in which the center of curvature of said changed inner surface remains fixed, whereby the visual rectilinear distortion is corrected by means of having the tangents of the angles the entering principal rays make with the axis substantially proportional to the tangents of the angles the exiting principal rays make with the axis.

The above, and other, objects and advantages of the present invention will appear more fully hereinafter from a consideration of the detailed description and claims which follow, taken together with the accompanying drawings, wherein one embodiment of the invention is illustrated. It is to be expressly understood, however, that the drawings are for the purpose of illustration only, and are not designed as a definition of the limits of the invention. Reference for this latter purpose should be had to the appended claims.

In the drawings, wherein like reference characters refer to like parts throughout the several views, Figure 1 is a side axial section view of the lens system construction to illustrate one embodiment thereof.

Figure 2:
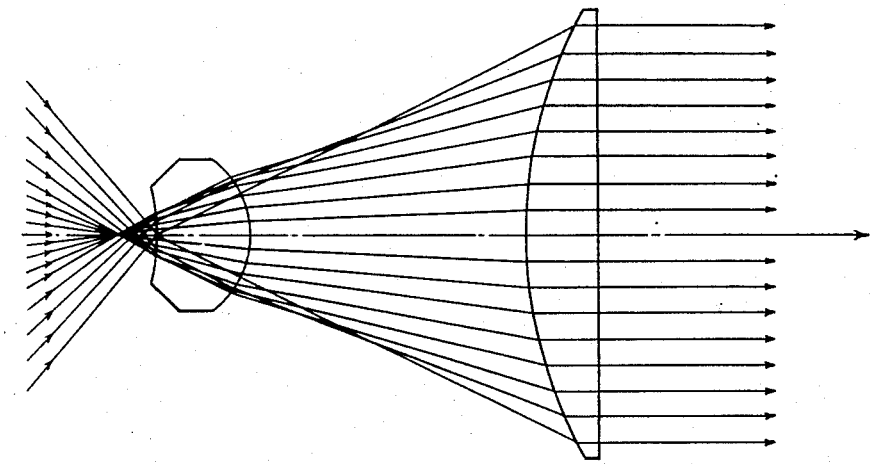

Figure 2 is a schematic diagrammatic view of the refracted principal rays with relation to the same section view taken through the axis.

The embodiment illustrated includes a concave-convex entrance lens member $L_1$ and a convex-plano field lens member $L_2$, designed, shaped and spaced according to the following formula, taking the unit as e. g., one millimeter.

| Lens | Radii | Thickness | Refractive Index—$N_D$ | V |
|---|---|---|---|---|
| $L_1$ | $R_1 = -101.46$ $R_2 = -47.56$ | $D_1 = 47.56$ $S_1 = 140.96$ | 1.7340 | 51.1 |
| $L_2$ | $R_3 = +226.43$ $R_4 = \infty$ | $D_2 = 35.0$ | 1.7340 | 51.1 |

Possible entrance field equals 100° approximately. $V = (N_D - 1)/(N_F - N_C)$ where N represents index of refraction, while D, F, and C respectively are the standard yellow, blue and red Fraunhofer spectral lines. The algebraic signs affixed to the numerical values of the radii indicate, for the plus, that the center of curvature is to the right of the surface, and, for the minus, that the center of curvature is to the left of the surface. Equivalent focal length equals 100 units.

In the above formula, R is the radius of curvature of the refracting surface, D is the axial thickness of the lens element between its refracting surfaces, and S is the axial air separation of the adjacent refracting surfaces of the two lenses. The above figures are for an optical system in which the exiting principal rays converge to a very distant point, i. e., the exit pupil is at a great distance behind the system.

In the above formula, the aperture for a central entering bundle has a maximum diameter of approximately 4.35 units.

The functions of the parts

Entrance lens member $L_1$ serves three main functions, as follows:

1. To refract the strongly diverging principal rays towards the field lens so that their angles to the axis will become small enough for the field lens to direct them back towards a point on the axis beyond the field lens.

2. To produce a suitable amount of spherical aberration of the principal rays to allow combining of its spherical aberration of the principal rays and the spherical aberration of the principal rays of the field lens to substantially correct rectilinear distortion.

3. To have a focal length such as to produce, in combination with the field lens, approximate color compensation by having lateral chromatic aberration correction for at least one zone in the same manner as the usual Huygens eyepiece.

The field lens member $L_2$ serves three main functions, as follows:

1. To refract the principal rays inwardly towards a point on the axis beyond the field lens.

2. To produce a suitable amount of spherical aberration of the principal rays to allow combining of its spherical aberration of the principal rays with the spherical aberration of the principal rays of the entrance lens to substantially correct rectilinear distortion.

3. To have a focal length such as to produce, in combination with the entrance lens, approximate color compensation by having lateral chromatic aberration corrected for at least one zone in the same manner as the usual Huygens eyepiece.

There is thus produced a novel objective and/or eyepiece for viewfinders, periscopes, or the like, adapted to substantially correct rectilinear distortion, and, at the same time, keeping other aberrations within tolerable limits, and also permit the manufacture of a more simple lens system for said uses. To obtain a large field of view of over 70°, having substantial rectilinear distortion correction, the tangents of the angles the entering principal rays make with the axis must be substantially proportional to the tangents of the angles the exiting principal rays make with the axis. In the prior art, systems which approach this correction, have been difficult to manufacture, either due to their complexity or due to the unusual shapes of at least two of the refracting surfaces. In the complex systems, lenses were employed which produced small amounts of spherical aberration to the principal rays, and thus brought about a condition which approximately met the Abbé sine condition for the principal rays, which sine condition states that the sines of the angles of the entering rays be proportional to the sines of the angles of the exiting rays. This relationship, even though perfect, does not produce correction of rectilinear distortion, since the proportionality of the tangents differs considerably from proportionality of the sines, particularly when large field angles are employed. In the prior art non-spherical systems, each zone is treated individually, and the tangent relation is approximately met in this way, but these systems are subject to errors when the size of the light bundle surrounding each principal ray is increased, and, in addition, the cost of manufacture of these peculiarly shaped non-spherical refracting surfaces is excessive.

In the applicant's lens system the lenses are more simple to construct than any in the prior art which approach rectilinear distortion correction for fields of over 70°, and, at the same time, improve this rectilinear distortion correction over that obtained in any other prior art for fields of over 70°. The focal length and shapes of the lenses in the applicant's objective are determined by having a principal ray, near the edge of the field, pass through the center of curvature of the inner surface of the entrance lens without selection of the radius of curvature of this inner surface, and having this principal ray proceed through a convex-plano form of field lens, then converge to a remote point on the axis beyond the field lens. Then, a radius of curvature is chosen for said inner surface of the entrance lens, so that at least one other principal ray meets said condition of proportionality of tangents. This said other principal ray is usually chosen nearer the center of the field. It will be noted that there is no refractive change in the said near the edge of the field principal ray caused by the change of the radius of curvature of the inner surface of the entering lens. The outer surface of the entering lens is usually taken with its vertex at the center of curvature of the inner surface of the entering lens, and thus any variation of radius of curvature of said entering surface will not change the refraction of said near the edge of the field principal ray. Thus, the radius of curvature of said outer surface can be varied to correct the intermediate zonal rectilinear distortion. By re-choosing the radius of curvature of said inner surface for a given radius of curvature of said outer surface, the said proportionality of tangents of the angles with the axis can be exactly maintained for the said other principal ray nearer the center of the field and the said near the edge of the field principal ray, and thence a final form can be obtained by suitably selecting radii of curvature for the outer and inner surfaces of the entering lens such as those illustrated, whereby, in combination with a convex-plano field lens, the rectilinear distortion can be substantially corrected for the whole field.

If glasses of higher index of refraction are used in the lenses, the rectilinear distortion correction is further bettered for the intermediate zone.

Although the present invention is only described and illustrated in detail for one embodiment thereof, it is to be expressly understood that the same is not limited thereto. Various changes may be made in design and arrangement of the system illustrated, as will now be apparent to those skilled in the art. For a definition of the limits of the invention, reference should be had to the appended claims.

What is claimed is:

1. An optical system for objectives and eyepieces comprising at least two lenses in at least equivalent axial alignment, two of said lenses being substantially according to the following formula, taking the focal length $f$ of said system as 100 units, and the lens members as $L_1$ and $L_2$:

| Lens | Radii | Thickness | Refractive Index—$N_D$ | V |
|---|---|---|---|---|
| $L_1$ | $R_1 = -101.46$ | $D_1 = 47.56$ | 1.7340 | 51.1 |
|  | $R_2 = -47.56$ | $S_1 = 140.96$ |  |  |
| $L_2$ | $R_3 = +226.43$ | $D_2 = 35.0$ | 1.7340 | 51.1 |
|  | $R_4 = \infty$ |  |  |  | in which $R_1$, $R_2$, $R_3$ and $R_4$ are vertex radii of curvature; $D_1$ and $D_2$ lens thicknesses; $S_1$ the space between the lenses; $N_D$ is the index of refraction in sodium light, and V is the reciprocal dispersion ratio; with the rear aperture stop at a very great distance in back of the field lens, with a relative aperture of less than F:10 for the complete system, and with an entrance field of view of approximately 100°, and whereby the rectilinear distortion is substantially corrected, and the lateral chromatic aberration is substantially corrected for an intermediate zone of the field.

2. An optical system for objectives and eyepieces, comprising at least two lenses in at least equivalent axial alignment, in which the first surface of the first principal lens of said lenses has a power value of between minus .81 times and minus .67 times the power value of the complete system, and in which the second surface of the first principal lens of said lenses has a power value of between plus 1.6 times and plus 1.4 times the power value of the complete system, and in which the first surface of the second principal lens of said lenses has a power value of between plus .37 times and plus .31 times the power value of the complete system, and in which the second surface of the second principal lens of said lenses has a power value of between plus .073 times and minus .073 times the power value of the complete system, and in which the thickness of the said first principal lens is between .45 times and .5 times the focal length of the complete system, and in which the separation of the said two principal lenses has a value between 1.3 times and 1.5 times the focal length of the complete system, and in which the thickness of the said second principal lens has a value between .34 times and .37 times the focal length of the complete system, and in which the mean index of refraction of said two principal lenses has a value between 1.65 and 1.75.

3. An optical system for objectives and eyepieces comprising at least two lenses in at least equivalent axial alignment, in which the first surface of the first principal lens of said lenses has a power value of between minus .92 times and minus .61 times the power value of the complete system, and in which the second surface of the first principal lens of said lenses has a power value of between plus 1.75 times and plus 1.41 times the power value of the complete system, and in which the first surface of the second principal lens of said lenses has a power value of between plus .37 times and plus .29 times the power value of the complete system, and in which the second surface of the second principal lens of said lenses has a power value of between plus .15 times and minus .15 times the power value of the complete system, and in which the thickness of the said first principal lens has a value between .4 times and .5 times the focal length of the complete system, and in which the separation of the said two principal lenses has a value between 1 times and 2 times the focal length of the complete system, and in which the thickness of the said second principal lens has a value between .3 times and .4 times the focal length of the complete system, and in which the mean index of refraction of said two principal lenses has a value between 1.6 and 1.8.

4. An optical system for objectives and eyepieces comprising at least two lenses in at least equivalent axial alignment in which the first surface of the first principal lens of said lenses has a power value of between minus 1.3 times and plus .18 times the power value of the complete system, and in which the second surface of the first principal lens of said lenses has a power value of between plus 2 times and plus .70 times the power value of the complete system, and in which the first surface of the last principal lens of said lenses has a power value of between plus .92 times and plus .25 times the power value of the complete system, and in which the second surface of the last principal lens of said lenses has a power value of between plus .21 times and minus .21 times the power value of the complete system, and in which the thickness of the said first principal lens has a value between .1 times and .7 times the focal length of the complete system, and in which the separation of the said two principal lenses has a value between .5 times and 2 times the focal length of the complete system, and in which the thickness of the said last principal lens has a value between .1 times and 5 times the focal length of the complete system, and in which the mean index of refraction of the said two principal lenses has a value between 1.4 and 1.9.

JOHN R. MILES.

REFERENCES CITED

The following references are of record in the file of this patent:

UNITED STATES PATENTS

| Number | Name | Date |
|---|---|---|
| 873,870 | Konig | Dec. 17, 1907 |
| 1,091,933 | Humbrecht | Mar. 31, 1914 |
| 1,347,673 | Bishop | July 27, 1920 |
| 1,620,339 | Frederick | Mar. 8, 1927 |
| 2,380,210 | Bennett | July 10, 1945 |
| 2,388,032 | Bennett | Oct. 30, 1945 |
| 2,407,219 | Bennett | Sept. 10, 1946 |

FOREIGN PATENTS

| Number | Country | Date |
|---|---|---|
| 126,837 | Great Britain | May 22, 1919 |